United States Patent Office 3,423,353
Patented Jan. 21, 1969

3,423,353
METHOD OF PREPARING HIGH SOLIDS VINYL ACETATE COPOLYMER LATICES
Eli Levine, Hillside, and John R. Costanza, North Plainfield, N.J., assignors to Celanese Corporation, New York, N.Y., a corporation of Delaware
No Drawing. Continuation-in-part of application Ser. No. 461,529, June 4, 1965. This application June 7, 1966, Ser. No. 555,669
U.S. Cl. 260—29.6          11 Claims
Int. Cl. C09d 5/02; C08f 45/24, 15/00

ABSTRACT OF THE DISCLOSURE

Vinyl acetate copolymer emulsion having a solids content of from about 58% to about 70% by weight and low viscosity are made by polymerizing in aqueous medium a monomer mixture of at least 50% but not more than about 75% by weight vinyl acetate in the presence of a polyether surfactant, subsequently adding to the polymerized copolymer emulsion a water soluble free radical polymerization catalyst, and reacting to substantially reduce the viscosity of the emulsion.

---

This application is a continuation-in-part of our copending U.S. patent applications Ser. Nos. 461,529, filed June 4, 1965, and 548,874, filed May 10, 1966.

This invention relates to novel methods of preparing aqueous polymer emulsions, as well as to the thus-prepared emulsions themselves.

More particularly, this invention relates to a novel method of preparing useful, stable aqueous vinyl acetate copolymer emulsions having higher solids contents than had hitherto been obtainable using conventional emulsion polymerization techniques, while at the same time having reduced viscosities and improved freeze-thaw stability.

It goes almost without saying that aqueous emulsions of vinyl acetate copolymers, as well as various methods for their preparation, have been known for many years. The procedures used to prepare such polymer emulsions generally involve first admixing, under rapid stirring, monomeric vinyl acetate together with one or more vinyl comonomers, water, surfactants or emulsifying agents, a polymerization catalyst or initiator, and, in most cases, a protective colloid-forming substance. This mixture is then heated to polymerization temperature, with continued stirring, for the time necessary to substantially completely form the polymer emulsion. The resulting emulsion, upon cooling and filtering, can be used for many purposes, among which are surface coatings, e.g., paints, paper coatings and textile treating agents, and adhesive applications.

One difficulty which has long been associated with polyvinyl acetate emulsions is their lack of freeze-thaw stability. This has limited the use of such emulsions in many areas, since to be completely acceptable for all applications a polymer emulsion must be stable over a wide range of temperatures.

Another and perhaps more serious problem encountered in polyvinyl acetate emulsions produced by techniques currently being practiced is that it is rarely if ever possible to prepare such emulsions having solids contents in excess of about 55% which are neither too viscous for convenient handling nor of such limited shelf stability as to render impossible their use in paints or other coatings. Obviously, it would be advantageous to be able to increase the amount of vinyl acetate polymer in these conventional emulsions, thereby providing emulsions having solids contents as high as about 70% or more. Such high solids emulsions would be more economical to ship and store, due to their decreased water content, and would also provide thicker coatings of polymer per pass in any coating or film-forming operation.

The present invention provides a solution to each of the aforementioned difficulties. More particularly, it has now been discovered, quite unexpectedly, that by adding a relatively large amount of water-soluble polymerization catalyst or initiator to a conventionally prepared aqueous polyvinyl acetate emulsion having a solids content of up to about 70% once the polymerization reaction has gone to substantial completion, the viscosity of the emulsion is markedly reduced. This gives useful, stable polyvinyl acetate emulsions having solids contents far higher than are found in known polyvinyl acetate emulsions, coupled with good freeze-thaw stability.

It is, therefore, an object of the present invention to provide novel methods of preparing aqueous copolymer emulsions.

A further object of the present invention is to provide aqueous polyvinyl acetate emulsions having higher solids contents than had hitherto been obtainable using known methods.

It is also an object of the present invention to provide aqueous polyvinyl acetate emulsions having reduced viscosities and improved freeze-thaw stability.

These and other objects of the present invention, as well as the means of effectuating them, will be discussed in greater detail hereinbelow.

The chemical or physical nature of the changes in the initially-prepared emulsion occasioned by postaddition of catalyst in the manner taught by the present invention is not clearly understood. However, without wishing to be bound by any particular theory or explanation or to be limited to any particular mechanism, applicants believe that the catalyst or initiator added once the initial polymerization reaction has gone to substantial completion attacks the surfactant and, when used, an ether linkage-containing protective colloid, reducing their molecular weights by an oxidative mechanism which involves rupture of ether linkages. This oxidative degradation reduces the effectiveness of the surfactant and the ether linkage-containing protective colloid, thus permitting a modest degree of particle agglomeration to occur, and it is further believed that it is this increase in the average particle size of the emulsion which accounts for the reduction in viscosity.

It should also be noted here that this reduction in viscosity, while providing the aforementioned beneficial results, does not adversely affect, to any noticeable extent, either the useful properties of the emulsion or the solids content thereof.

The emulsions prepared by the novel methods of the present invention contain copolymers of vinyl acetate with one or more different, ethylenically unsaturated comonomers, preferably ones containing a $H_2C\!=\!C\!<$ group. Generally, when preparing these copolymers, from about 25% to about 50% by weight, and preferably from about 30% to about 35% by weight, based on the total weight of monomers present, of monomers other than vinyl acetate will be used, with the total amount of vinyl acetate plus monomers other than vinyl acetate whose water solubility is equal to or greater than that of vinyl acetate (i.e., a solubility equal to or greater than 2.5 grams per 100 grams of water at 25° C.) being, in all cases, not more than about 75% by weight, based on the total weight of monomers present.

Included among such comonomers are monoethylenically unsaturated aliphatic hydrocarbons such as ethylene, propylene and isobutylene, and monoethylenically unsaturated substituted aliphatic hydrocarbons such as vinyl fluoride, vinyl chloride, vinyl bromide, vinylidene fluoride, 1-chloro-1-fluoroethylene, chlorotrifluoroethylene and tetrafluoroethylene.

In addition, one can also use unsaturated acids such as acrylic acid, methacrylic acid, crotonic acid and itaconic acid, as well as polymerizable derivatives thereof, e.g., alkyl acrylates and methacrylates such as methyl acrylate, ethyl acrylate, n-propyl acrylate, n-butyl acrylate, isobutyl acrylate, 2-ethylhexyl acrylate, methyl methacrylate, ethyl methacrylate, n-propyl methacrylate and isobutyl methacrylate, acrylonitrile, methacrylonitrile, acrylamide, methacrylamide, N-methylolacrylamide, alkylated N-methylolacrylamides such as N-methoxymethylacrylamide and N-butoxymethylacrylamide, and acrolein.

Further, other derivatives of the hypothetical vinyl alcohol, e.g., aliphatic vinyl esters such as vinyl formate, vinyl propionate and vinyl butyrate, aliphatic vinyl ethers such as methyl vinyl ether, ethyl vinyl ether and n-butyl vinyl ether, and vinyl ketones such as methyl vinyl ketone, ethyl vinyl ketone and isobutyl vinyl ketone, can also be employed, as can allyl esters of saturated (which includes polymerizably non-reactive unsaturation) monocarboxylic acids, e.g., allyl acetate, allyl propionate and allyl lactate, and alkyl esters of monoethylenically unsaturated dicarboxylic acids, e.g., diethyl maleate, dibutyl maleate, dioctyl maleate, dipropyl fumarate, dibutyl fumarate, dioctyl fumarate, didecyl fumarate, dibutyl itaconate and dioctyl itaconate.

Since the conditions under which the initial emulsion polymerization reaction (prior to the post-addition of initiator in the amounts taught by the present invention) are those conventionally used in the art, the surfactants or emulsifying agents employed can be any of the anionic, cationic or non-ionic materials usually employed for this purpose, as well as mixtures thereof, provided that a predominant amount, i.e., from about 50% to about 100% by weight, based on the total surfactant content, and preferably all, of the surfactant present contains at least four, and preferably more than four, ether linkages, and they will be used in conventional amounts (generally from about 1% to about 10% by weight, based on the total weight of monomers present).

A particularly preferred class of polyether surfactants or emulsifying agents encompasses ethylene oxide and propylene oxide condensates in general, e.g., straight and branched-chain alkyl and alkylaryl polyethylene glycol and polypropylene glycol ethers and thioethers, and more particularly substances such as the "Igepals," which are members of a homologous series of alkylphenoxypoly (ethyleneoxy) ethanols, which series can be represented by the general formula

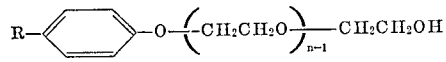

wherein R represents an alkyl radical and $n$ represents the number of mols of ethylene oxide employed, included among which are alkylphenoxypoly (ethyleneoxy) ethanols having alkyl groups containing from about 7 to about 18 carbon atoms, inclusive, and having from about 4 to about 100 ethyleneoxy units, such as the heptylphenoxypoly (ethyleneoxy) ethanols, nonylphenoxypoly (ethyleneoxy) ethanols and dodecylphenoxypoly (ethyleneoxy) ethanols; the sodium, potassium or ammonium salts of the sulfate esters of these alkylphenoxypoly (ethyleneoxy) ethanols; alkylpoly (ethyleneoxy) ethanols; alkylpoly (propyleneoxy) ethanols; octylphenoxyethoxy ethyldimethylbenzylammonium chloride; polyethylene glycol t-dodecylthioether; the "Tweens," which are polyoxyalkylene derivatives of hexitol (including sorbitans, sorbides, mannitans and mannides) anhydride partial long-chain fatty acid esters, such as the polyoxyalkylene derivatives of sorbitan monolaurate, sorbitan monopalmitate, sorbitan monostearate, sorbitan tristearate, sorbitan monooleate and sorbitan trioleate, the "Pluronics," which are condensates of ethylene oxide with a hydrophobic base, formed by condensing propylene oxide with propylene glycol, and the like.

As previously indicated, a protective colloid-forming substance is generally employed, and will usually contain at least one ether linkage, and preferably a plurality thereof. Included among such ether linkage-containing materials are hydroxymethyl cellulose, hydroxyethyl cellulose, ethyl hydroxyethyl cellulose, ethoxylated starch derivatives, and the like. However, other protective colloid-forming substances, i.e., ones containing no ether linkages, can also be used either alone or together with said ether linkage-containing materials, and included among these are partially and fully hydrolyzed polyvinyl alcohols, natural and synthetic gums, such as gum tragacanth and gum arabic, polyacrylic acid, poly (methyl vinyl ether/maleic anhydride), and the like. All of these materials will be used in the amounts found in conventional emulsion polymerization procedures (generally from about 0.1% to about 2% by weight, based on the total weight of the emulsion).

The emulsified monomer mixture is polymerized in the usual manner, i.e., by means of a catalytic amount of a conventional free radical polymerization catalyst or catalyst system (which can also be referred to as an addition polymerization catalyst, a vinyl polymerization catalyst or a polymerization initiator), with the proviso that the catalyst or catalyst system be substantially water soluble. An illustrative but by no means exhaustive enumeration of such catalysts includes inorganic peroxides such as hydrogen peroxide, sodium perchlorate and sodium perborate, inorganic persulfates such as sodium persulfate, potassium persulfate and ammonium persulfate, and redox systems such as sodium metabisulfite-potassium persulfate, and the like.

The particular catalyst or catalyst system employed initially (as distinguished from that added once the emulsion polymerization has gone to substantial completion) can generally be used in amounts ranging from about 0.01% to about 3% by weight, based on the total weight of monomer present.

This initial polymerization reaction will usually be carried out at a temperature ranging from about 0° C. to about 100° C., and preferably at from room temperature (about 25° C.) to about 80° C., with the emulsion preferably being stirred or otherwise agitated during the reaction, until a solids content of from about 58% to about 70%, and generally from about 60% to about 65%, by weight, based on the total weight of the emulsion, has been reached. At this point, the system is ready for post-catalysis in accordance with the novel process of the present invention.

In every case, the particular quantity of post-added catalyst or initiator employed is as dependent on the nature of the catalyst itself as the emulsion being treated. In general, however, from about 0.1% to about 0.75%, and preferably from about 0.2% to about 0.4%, by weight, based on the total weight of monomer employed, of a free radical polymerization catalyst or catalyst system, such as one of those mentioned hereinabove, will be used.

Thus, for example, when a persulfate, and particularly sodium or potassium persulfate, is employed to post-treat 80:20 vinyl acetate-acrylate or methacrylate copolymer emulsions, from about 0.1% to about 0.2% by weight, based on the total weight of monomer initially present, has been used satisfactorily.

This post-addition of initiator can be carried out at room temperature, but higher temperatures, which accelerate the action of the catalyst in reducing the viscosity of the emulsion, are preferred. Thus, the post-added initiator will be added to the pre-formed polymer emulsion, either continuously or, preferably, in individual increments, at a temperature ranging from about 65° C. to about 95° C. over a period of from about 30 minutes to about 3 hours, with the emulsion being kept under mild continuous agitation during the addition of initiator and for about 30 minutes after this addition has been completed.

Since the post-added initiator will preferably be introduced as a 1–60% aqueous solution, in order to maintain a uniform non-volatile content in the emulsion the amount of water necessary to dissolve or disperse the post-added initiator should be deducted from the water which is used initially in preparing the emulsion.

At this point, the viscosity of the post-catalyzed emulsion has been substantially reduced, as witness the fact that a typical vinyl acetate-ethyl acrylate-dioctyl maleate terpolymer emulsion, containing 75% by weight of vinyl acetate, based on the total weight of monomers employed, and having a solids content of about 65% (a higher non-volatile content than had hitherto been possible in useful, stable emulsions of this type prepared by conventional methods), which has been post-treated with initiator in accordance with the teachings of the present invention has a viscosity of from about 1,000 to about 3,000 cps., as compared to a viscosity well in excess of 10,000 cps. in a similar emulsion which has not been post-catalyzed. Similarly, such a post-catalyzed emulsion survives 5 cycles of alternate freezing and thawing without coagulating, while a similar emulsion which has not been post-catalyzed has poor freeze-thaw stability, and generally coagulates after one freeze-thaw cycle.

The procedure employed herein to measure freeze-thaw stability is as follows: First, a four-ounce wide-mouth glass jar of approximately 58 mm. inside diameter is filled with a sample of the latex. The Brookfield viscosity at 75°±3° F. is then measured, and a film of the original latex is cast. Next, the jar is closed and placed inside a one-quart can, which is then sealed and placed in a suitable cold box. After the can has been held at 10°±3° F. for 16 hours, it is removed from the cold box and thawed at room temperature for three hours. The jar is then removed from the can and thawed for an additional three hours at room temperature. This treatment constitutes one freeze-thaw cycle.

After each freeze-thaw cycle the thawed latex is stirred in the jar at moderate speed for five minutes to obtain a homogeneous mixture, from which the Brookfield viscosity is measured at 75°±3° F. and a film is cast. The viscosity of the thawed latex and the appearance of the film are then compared with the results obtained using the original latex, and a major deterioration of the film appearance or a six-fold increase in viscosity is taken as the point at which a sample is considered to have failed. A sample which passes five freeze-thaw cycles is considered to have satisfactory free-thaw stability.

In order that those skilled in the art can more fully understand the present invention, the following examples are set forth. These examples are given solely for the purpose of illustrating the invention, and should not be considered as expressing limitations unless so set forth in the appended claims. All parts and percentages are by weight, unless otherwise stated.

Example I

A surfactant mixture comprising:

| Component: | Parts |
|---|---|
| Tergitol NP–14 (nonylphenylpolyethylene glycol ether; Union Carbide Corp.) | 2.0 |
| Santomerse #3 (70% alkyl aryl sodium sulfonate in water; Monsanto Chemical Co.) | 3.0 |
| Pluronic F–68 (condensate of ethylene oxide with a hydrophobic base formed by condensing propylene oxide with a propylene glycol; Wyandotte Chemicals Corp.) | 3.9 |
| Pluronic L–61 (ethylene oxide-hydrophobic base condensate homologous to Pluronic F–68; Wyandotte Chemicals Corp.) | 15.7 |
| Cellosize WP–09 (hydroxyethyl cellulose; Hercules Powder Company, Inc.) | 6.2 |
| Nopco NDW (defoamer; a blend of mixed hydrocarbons, metallic soaps and 0.5% silicone oil; Nopco Chemical Co., Inc.) | 2.5 |
| Sodium bicarbonate (buffer) | 1.6 | was dispersed in 210 parts of deionized water and then charged to a polymerization reactor.

Next, 15% of a monomer mixture comprising:

| Component: | Parts |
|---|---|
| Vinyl acetate | 389 |
| Dibutyl fumarate | 133 | was charged to the reactor with stirring, followed by 1.56 parts of potassium persulfate. Heat was then applied to the reactor until, at a temperature of 80° C., all refluxing ceased.

Delayed monomer addition was then begun and programmed to run over a 4 hour period, during which time the remainder of the monomer mixture was added. Simultaneously, the addition of 69 parts of an aqueous 2.6% potassium persulfate solution was begun, and was programmed to run over a 4.5 hour period at a rate of 2.55 parts every 10 minutes. Stirring was continued during this addition of monomer and catalyst, and the reaction temperature was maintained at 80° C. until the last of the catalyst had been added. Then, the temperature of the emulsion was raised to 90° C. and held at that temperature, with stirring, for 30 minutes. At this point, the emulsion had a solids content of 65% and a viscosity estimated to be well in excess of 10,000 cps.

To this emulsion there were then added, over a 10 minute period with stirring, 17.5 parts of a warm (45° C.) aqueous 10% potassium persulfate solution. Following this addition heating was continued to maintain a temperature of 90° C. for 30 minutes. The resulting emulsion, after cooling to room temperature and filtration, had a viscosity of 2,000 cps. and was stable for five cycles when tested for freeze-thaw stability.

Example II

A surfactant mixture comprising:

| Component: | Parts |
|---|---|
| Tergitol NP–14 | 4.0 |
| Igepal CO–630 [nonylphenoxypoly (ethyleneoxy) ethanol; Antara Chemicals] | 33.5 |
| Igepal CO–977 [nonylphenoxypoly (ethyleneoxy) ethanol homologous to Igepal CO–630; Antara Chemicals] | 6.0 |
| Cellosize WP–09 | 7.7 |
| Nopco NDW | 1.0 |
| Sodium bicarbonate | 0.9 | was dispersed in 250 parts of deionized water and then charged to a polymerization reactor.

Next, 15% of a monomer mixture comprising:

| Component: | Parts |
|---|---|
| Vinyl acetate | 385.2 |
| Ethyl acrylate | 92.4 |
| Dioctyl maleate | 36.0 | was charged to the reactor with stirring, followed by 0.56 part of potassium persulfate. Heat was then applied to the reactor until, at a temperature of 70° C., all refluxing ceased.

Delayed monomer addition was then begun and programmed to run over a 4 hour period, during which time the remainder of the monomer mixture was added. Simultaneously, the addition of 50 parts of an aqueous 0.5% potassium persulfate solution was begun, and was programmed to run over a 4.5 hour period at a rate of 1.85 parts every 10 minutes. Stirring was continued during this addition of monomer and catalyst, and the reaction mixture was maintained at 70° C. until the last of catalyst had been added. Then, the temperature of the emulsion was raised to 90° C. and held at that temperature, with stirring, for 30 minutes. At this point, the emulsion had a solids content of 65% and a viscosity estimated to be well in excess of 10,000 cps.

To this emulsion there were then added, over a 10 minute period, with stirring, 12 parts of a warm (45° C.) aqueous 10% potassium persulfate solution. Following this addition heating was continued to maintain a temperature of 90° C., for 30 minutes. The resulting emulsion, after cooling to room temperature and filtration, had a viscosity of 1,000 cps. and was stable for five cycles when tested for freeze-thaw stability.

By repeating this procedure in every detail but one, namely, replacing potassium persulfate in the initial stage, i.e., prior to delayed monomer addition, with equivalent amounts of sodium persulfate, ammonium persulfate and hydrogen peroxide, respectively, substantially equivalent results were achieved.

The entire procedure of the foregoing example was repeated four times in every detail but one, namely, potassium persulfate was replaced throughout by equivalent amounts of hydrogen peroxide, sodium perchlorate, sodium persulfate and ammonium persulfate respectively. In each case, the resulting emulsion had a solids content of approximately 65% and a viscosity of less than 3,000 cps., and in addition was stable for 5 cycles when tested for freeze-thaw stability.

Similarly, by again repeating the entire procedure of the foregoing example in every detail but one, namely, replacing only the post-added potassium persulfate with an equivalent amount of ammonium persulfate, a useful, stable emulsion containing approximately 65% solids and having improved viscosity and freeze-thaw stability was again obtained.

Example III

A surfactant mixture comprising:

| Component: | Parts |
|---|---|
| Tergitol NP-14 | 3.23 |
| Igepal CO-630 | 4.80 |
| Igepal CO-977 | 27.23 |
| Cellosize WP-09 | 2.55 |
| Nopco NDW | 0.60 |
| Sodium bicarbonate | 0.70 | was dispersed in 220.40 parts of deionized water and then charged to a polymerization reactor.

Next, 56.20 parts of a monomer mixture comprising:

| Component: | Parts |
|---|---|
| Vinyl acetate | 339.60 |
| Ethyl acrylate | 81.90 |
| Dioctyl maleate | 31.80 | was charged to the reactor with stirring, followed by 0.50 part of potassium persulfate. Heat was then applied to the reactor until, at a temperature of 72° C., all refluxing ceased.

Delayed monomer addition was then begun and programmed to run over a 4 hour period, during which time the remainder of the monomer mixture (397.10 parts) was added. Simultaneously, the addition of 0.20 part of potassium persulfate in 5 parts of water was begun and was also programmed to run over a 4 hour period at a rate of 1.25 parts per hour. Stirring was continued during this addition of monomer and catalyst, and the reaction temperature was maintained at 72° C. (until the addition of monomer and catalyst was complete). At this point, the emulsion had a solids content of 67.0% and a viscosity in excess of 10,000 cps.

To the thus-obtained emulsion there were then added, over a 90 minute period, with stirring 1.25 part of potassium persulfate and 0.30 part of sodium bicarbonate in 30.20 parts of deionized water, with the temperature of the reaction mixture being maintained at 72° C. for the first 60 minutes of this addition and then raised to 90° C. and held at that temperature for the final 30 minutes. The resulting emulsion, after cooling to room temperature and filtration, had a viscosity of 3,750 cps. and was stable for five cycles when tested for freeze-thaw stability.

Example IV

A vinyl acrylic interior flat paint containing a polyvinyl acetate emulsion produced in accordance with the present invention can be formulated as follows:

| Component | Pounds | Gallons |
|---|---|---|
| Vinyl acetate copolymer emulsion of Example III (adjusted to 65% solids) | 127.0 | 13.7 |
| Aqueous 2% Methocel (methyl cellulose solution; viscosity, 4,000 cps. at 20° C.; Dow Chemical Co.) | 304.7 | 36.5 |
| Texanol (2,2,4-trimethylpentanediol monoisobutyrate; Eastman Chemical Company) | 4.0 | 0.5 |
| Potassium tripolyphosphate | 2.0 | --- |
| Titanium dioxide—rutile | 120.0 | 3.4 |
| Atomite (water-ground calcium carbonate; Thompson-Weinman Co.) | 364.7 | 16.2 |
| Water | 150.0 | 17.9 |
| Propylene glycol | 30.0 | 3.5 |
| Phenyl mercuric acetate (bacteriocide) | 0.3 | --- |
| Water | 93.4 | 11.2 |
| | 1,196.1 | 102.99 |

The resulting paint had a weight/gallon of 11.62 lbs., a solids content of 48.04%, a solids volume of 27.21% and a pH of 7.0.

It will be obvious to those skilled in the art that other changes and variations can be made in carrying out the present invention without departing from the spirit and scope thereof as defined in the appended claims.

We claim:
1. A method of preparing a useful, stable aqueous emulsion of a vinyl acetate copolymer which consists essentially of:
   (1) emulsion polymerizing, at temperatures ranging from about room temperature to about 95° C., in an aqueous medium, a monomer mixture containing at least about 50% by weight of vinyl acetate, with not more than about 75% by weight of said monomer mixture being vinyl acetate alone or together with ethylenically unsaturated monomers other than vinyl acetate, whose water solubility is equal to or greater than that of vinyl acetate, said percentage being based on the total weight of monomer used, in the presence of surfactant, at least about 50% by weight of which is a polyether containing at least four ether linkages, and a catalytic amount of a water soluble free radical polymerization catalyst, thereby substantially completely polymerizing said monomer mixture to provide a copolymer emulsion having solids content of from about 58% to about 70% by weight, based on the total weight of said emulsion,
   (2) subsequently adding to said copolymer emulsion from about 0.1% to about 0.75% by weight, based on the total weight of said monomer mixture, of a water soluble free radical polymerization catalyst, and
   (3) reacting the resulting catalyzed copolymer emulsion to substantially reduce the viscosity thereof.

2. A process as described in claim 1 wherein said copolymer emulsion as a solids content of from about 60% to about 65% by weight, based on the total weight of said emulsion.

3. A process as described in claim 1 wherein from about 0.2% to about 0.4% by weight, based on the total weight of said monomer mixture, of a free radical polymerization catalyst is subsequently added to said copolymer emulsion.

4. A process as described in claim 1 wherein said free radical polymerization catalyst is potassium persulfate.

5. A process as described in claim 1 wherein said free radical polymerization catalyst is ammonium persulfate.

6. A process as described in claim 1 wherein said monomer mixture is vinyl acetate and dibutyl fumarate.

7. A process as described in claim 1 wherein said monomer mixture is vinyl acetate, ethyl acrylate and dioctyl maleate.

8. A process as described in claim 1 wherein said polyether is an ethylene oxide condensate.

9. A process as described in claim 1 wherein said polyether is a propylene oxide condensate.

10. A process as described in claim 1 wherein said polyether is an alkylphenoxypoly(ethyleneoxy) ethanol.

11. A process as described in claim 1 wherein said polyether is a nonplphenoxypoly(ethyleneoxy) ethanol.

References Cited

UNITED STATES PATENTS

| | | | |
|---|---|---|---|
| 2,508,341 | 5/1950 | Wilson | 260—17 |
| 2,892,802 | 6/1959 | Budewitz | 260—17 |
| 2,956,973 | 11/1960 | Holdsworth | 260—29.6 |
| 3,275,589 | 9/1966 | Alexander | 260—29.6 |
| 3,330,795 | 7/1967 | Schluter | 260—29.6 |

SAMUEL H. BLECH, *Primary Examiner.*

J. T. GOOLKASIAN, *Assistant Examiner.*

U.S. Cl. X.R.

260—78.5, 80.81, 85.7, 86.1